(12) United States Patent
Mandell, III

(10) Patent No.: US 10,952,524 B2
(45) Date of Patent: Mar. 23, 2021

(54) FOOD PREPARATION UTENSIL HOLSTER

(71) Applicant: Samuel J. Mandell, III, Dallas, TX (US)

(72) Inventor: Samuel J. Mandell, III, Dallas, TX (US)

(*) Notice: Subject to any disclaimer, the term of this patent is extended or adjusted under 35 U.S.C. 154(b) by 0 days.

(21) Appl. No.: 16/143,176

(22) Filed: Sep. 26, 2018

(65) Prior Publication Data
US 2019/0090619 A1    Mar. 28, 2019

Related U.S. Application Data

(60) Provisional application No. 62/563,253, filed on Sep. 26, 2018.

(51) Int. Cl.
*A45F 5/00* (2006.01)
*A47J 47/16* (2006.01)
*A45C 13/02* (2006.01)
*A45F 3/14* (2006.01)

(52) U.S. Cl.
CPC ............... *A45F 5/00* (2013.01); *A47J 47/16* (2013.01); *A45C 2013/026* (2013.01); *A45F 2003/142* (2013.01); *A45F 2200/0566* (2013.01); *A45F 2200/0575* (2013.01)

(58) Field of Classification Search
CPC ...... F41C 33/02; F41C 33/04; F41C 33/0209; F41C 33/0218; F41C 33/041; F41C 33/046; F41C 33/0227; A45F 2200/0591; B26B 29/025; Y10S 224/911
See application file for complete search history.

(56) References Cited

U.S. PATENT DOCUMENTS

| | | | | |
|---|---|---|---|---|
| 4,258,871 A * | 3/1981 | McMahon | ............ | F41C 33/046 224/192 |
| 4,966,320 A * | 10/1990 | DeSantis | .................. | A45C 1/04 224/192 |
| 6,029,270 A * | 2/2000 | Ost | .......................... | A41D 3/00 2/2.5 |
| D571,553 S * | 6/2008 | Logan | ........................... | D3/226 |
| 7,631,368 B1 * | 12/2009 | Samson | .................. | F41C 33/02 2/115 |
| 8,484,765 B2 * | 7/2013 | French | ................... | A41D 27/20 2/250 |
| D694,518 S * | 12/2013 | Aissa | .............................. | D3/224 |
| 2003/0042284 A1 * | 3/2003 | Reiserer | .................... | A45F 5/02 224/660 |
| 2008/0093406 A1 * | 4/2008 | Logan | ...................... | A45F 3/14 224/682 |
| 2009/0025117 A1 * | 1/2009 | French | ................... | A41D 27/20 2/69 |

(Continued)

*Primary Examiner* — Brian D Nash
(74) *Attorney, Agent, or Firm* — Dickinson Wright PLLC; Kristopher Lance Anderson

(57) ABSTRACT

Disclosed is an invention in the field of food preparation. The present disclosure describes a holster apparatus for holding one or more food preparation utensils capable of being worn by a person for use during food preparation. The holster configuration is capable of maintaining health standards required for a food preparation environment and may be patterned or configured to house various types of food preparation utensils. The holster of the present disclosure is capable of adjustment for individual fit and may include further holsters or receptacles for holding utensils.

17 Claims, 4 Drawing Sheets

(56) References Cited

U.S. PATENT DOCUMENTS

| | | | |
|---|---|---|---|
| 2012/0055822 A1* | 3/2012 | Bullock | A45C 11/00 |
| | | | 206/320 |
| 2013/0327800 A1* | 12/2013 | Xu | B60R 7/04 |
| | | | 224/275 |
| 2016/0244239 A1* | 8/2016 | Nash | A45F 3/04 |
| 2018/0180380 A1* | 6/2018 | Catner | F41C 33/0209 |
| 2018/0252458 A1* | 9/2018 | Furneaux | F25D 3/08 |
| 2018/0289137 A1* | 10/2018 | Goldman | A45F 5/00 |
| 2019/0008264 A1* | 1/2019 | Furstenburg | A45F 3/04 |
| 2019/0011221 A1* | 1/2019 | Harris | F41C 33/048 |

* cited by examiner

FOOD PREPARATION UTENSIL HOLSTER

CROSS-REFERENCE TO RELATED APPLICATIONS

The present application is related to U.S. Provisional Patent Application 62/563,253, filed on Sep. 26, 2018, titled "Food Preparation Utensil Holder" the content of which is incorporated by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

STATEMENT OF FEDERALLY FUNDED RESEARCH

None.

TECHNICAL FIELD

The present invention relates in general to the field of food preparation. In particular, the present invention relates to a holster for utensils used in food preparation.

BACKGROUND OF THE DISCLOSURE

Food preparation requires the use of specialized tools and utensils. Often the various utensils are stored or positioned around food preparation areas, such as counters and tables. These utensils are typically stored in drawers or along shelves. Other times, these utensils may be placed within containers, such as pots or other receptacles, for use and re-use during food preparation.

Individuals and the food industry have always sought ways to efficiently prepare food without contamination of the food, containers, or any associated preparation utensils. Contamination problems can arise when food preparation and serving utensils are separated from their container. For example, a serving spoon or fork can lay on a dirty surface where the container rests. Other instances of contamination include use of a food preparation utensil by someone having a cold or illness, after which the utensil is placed into the container and contaminates the contents of the container. In other instances, it is desirable to keep the food preparation utensils from containers which might become contaminated with grease, residues, and food particles. Additionally food items and ingredients tend to become attached to the utensils making it difficult or messy to grip, re-use or place down for future use. Other instances involve simple convenience in placing utensils down for other activities, only to need the utensil shortly thereafter. It is desirable to keep the utensil or utensils as part of food preparation environment while maintaining the ability to (i) keep the utensils off of food preparation surfaces, and (ii) maintaining food preparation safety standards.

While some technological advances have allowed for enhanced productivity and safety in food preparation, there remains a need in the art for the improved utensil handling capabilities, particularly with in-use utensils.

SUMMARY OF THE DISCLOSURE

The present disclosure addresses failings in the art by providing a holster apparatus for holding one or more food preparation utensils. It is one object of the disclosure to provide a holster apparatus capable of being worn by a person for use during food preparation. It is a second object of this present disclosure to utilize a holster configuration capable of maintaining health standards required for a food preparation environment. It is another object of the present disclosure the holster to be patterned or configured to house various types of food preparation utensils. The holster of the present disclosure is capable of adjustment for individual fit. Additional features of the present disclosure may include further holsters or receptacles for holding utensils, such as a quiver-like receptacle located on the back of the individual wearing the holster of the present disclosure.

In another aspect the holster apparatus of the present disclosure comprises an insert which is removable and capable of being cleaned after use to ensure the holster remains in compliance with health standards. In another aspect, the holster exterior is also made of a material capable of being cleaned or washed. In a further aspect, the holster interior is comprised of an acrylic insert capable of being removed, cleaned and re-inserted into the holster for re-use.

It is another object of the present disclosure to provide a holster apparatus to be worn by a food preparation person wherein the utensils held within the holster are readily accessible to the food preparation person. In one aspect the invention of the present disclosure removes the need for containers to be used to hold the utensils while not in use. The utensils are also able to be carried by the user in a sanitary manner while the user attends to other food preparation tasks.

In one aspect the present disclosure provides a utensil holster, comprising one or more holsters for receiving one or more utensils, wherein the one or more holsters each further comprises a removable insert having an opening capable of receiving a utensil into the removable insert while installed in the holster. The one or more holsters are capable of receiving and storing a utensil while maintaining food safety requirements. The one or more removable inserts may be comprised of plastic. The one or more removable inserts may be comprised of acrylic.

In one aspect, the exterior portion of the one or more holsters is made of leather. In another aspect, the exterior portion of the one or more holsters is made of fabric.

In another aspect, the one or more holsters are securable to a user by additional straps or bands, wherein the one or more removable inserts are capable of being removed and cleaned prior to re-insertion into the one or more holsters. The one or more holsters are configured for receiving a utensil selected from a group consisting of: a fork, spoon, pizza cutter, scraper, rolling pin, cutlery, dough cutter, dough knife, spatula, grater, and a brush. The one or more holsters comprise removable fasteners to allow the one or more holsters to operably unfold in order to remove the removable insert from the holster.

In another aspect, the holster is a shoulder holster or a waist holster.

It is another object of the present disclosure to provide a system for in-use utensil storage, comprising one or more holsters for receiving and housing a utensil, further comprising an exterior portion and interior removable insert fastened by one or more removable fasteners, wherein the interior removable insert may be removed from the external portion of the one or more holster assemblies for purposes of cleaning the removable insert in accordance with food safety requirements. The one or more removable inserts may be comprised of plastic or may be comprised of acrylic.

In another aspect the exterior portion of the one or more holsters is made of leather or fabric, and are securable to a user by additional straps or bands.

The details of one or more embodiments of the present disclosure are set forth in the accompanying drawings and description below. Other aspects, features and advantages will be apparent from the description and drawings.

BRIEF DESCRIPTION OF THE DRAWINGS

The foregoing and other objects, features, and advantages of the disclosure will be apparent from the following description of embodiments as illustrated in the accompanying figures and drawings.

DETAILED DESCRIPTION OF THE DISCLOSURE

Figure 1:
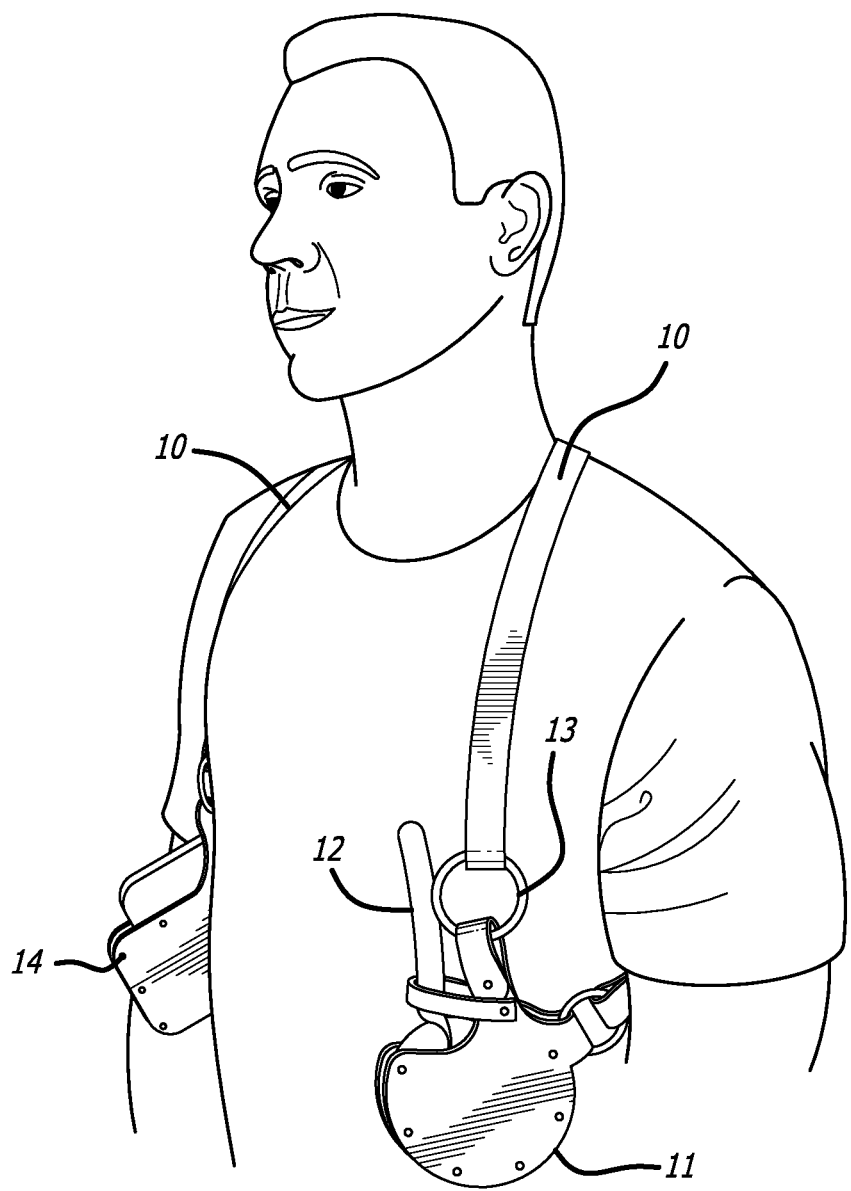
FIG. 1 depicts a dual shoulder holster of the present disclosure being worn by a person.

While the making and using of various embodiments of the present invention are discussed in detail below, it should be appreciated that the present invention provides many applicable inventive concepts that can be embodied in a wide variety of specific contexts, goods, or services. The specific embodiments discussed herein are merely illustrative of specific ways to make and use the disclosure and do not delimit the scope of the disclosure.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The present invention will now be described more fully hereinafter with reference to the accompanying figures and drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, compositions, processes, or systems. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

For the purposes of the present disclosure, a "utensil" is a mechanical tool, implement, container, or other article, particularly for use in food handling, preparation, or consumption. A kitchen utensil is a small handheld tool used for food preparation. Common kitchen tasks include cutting food items to size, heating food on an open fire or on a stove, baking, grinding, mixing, blending, and measuring; different utensils are made for different tasks. A general purpose utensil such as a chefs knife may be used for a variety of foods; other kitchen utensils are highly specialized and may be used only in connection with preparation of a particular type of food, such as an egg separator or an apple corer. Some specialized utensils are used when an operation is to be repeated many times, or when the user has limited dexterity or mobility. The number of utensils in a household kitchen varies with time and the style of cooking. A partially overlapping category of utensils is that of eating utensils, which are tools used for eating (i.e. the more general category of tableware). Some utensils are both kitchen utensils and eating utensils. Cutlery (i.e. knives and other cutting implements) can be used for both food preparation in a kitchen and as eating utensils when dining. Other cutlery such as forks and spoons are both kitchen and eating utensils. For the present disclosure, specialized utensils used for food preparation include, but are not limited to: pizza slicers, scrapers, rolling pins, cutlery, and the like. In an exemplary embodiment, the utensil is a pizza slicer. In another exemplary embodiment, the utensil is a scraper, which may also be considered a dough knife.

For the purposes of the present disclosure, a "holster" is a receptacle conformed as a sheath-like carrying case, similar to those for carrying a firearm, which is attached to a belt, shoulder sling, or other attachment means. The holster of the present disclosure is meant to carry an item on a person. Holsters are generally designed to offer protection to the article carried, secure its retention, and provide ready access to it. The need for ready access is often at odds with the need for retention and protection, so a user must choose the right balance. Holsters are generally designed to provide access to the article being carried with one hand, allowing the article to be removed and/or replaced with the same hand. To be able to return the article to its holster one-handed, the holster must be made from stiff material that holds its shape so that the holster won't collapse when the object is no longer inside to give it support. Holsters are generally attached to a person's belt or waistband or clipped to another article of clothing. Holsters are generally worn in a location where they can be readily accessible.

Since holsters are typically made from fairly stiff yet tough materials, there are a limited number of common choices. The traditional material is leather. It has an attractive appearance and can be dyed in many colors and/or embossed with elaborate designs for cosmetic reasons. Nylon, including ballistic nylon is another common fabric for holsters, as it is stiff, wear resistant, and thick enough to provide protection. Molded plastics, such as Kydex, are also popular, due to their low cost and robustness. For the purpose of the present invention, the holster is configured to house, and to provide ready access to, a utensil as defined in the present disclosure.

In an exemplary embodiment of the present disclosure, the holster is comprised of leather or leather-like material. When in a food preparation setting, many food ingredients tend to be moved and disturbed. In such environments, it is preferable to have a non-porous or non-absorptive material that can be easily cleaned. Leather or leather-like materials are capable of being wiped clean as opposed to fabrics which may become soaked or covered during use. For example, in pizza-making facilities, the use of flour is abundant. The leather holster is capable of being wiped clean of flour residue, whereas nylon or other fabrics would result in caked on flour and residues.

In one embodiment one or more holsters are configured to be worn using a shoulder strap. These shoulder holsters consist of two straps connected in a manner similar to a backpack, wherein one or more holsters are positioned on the user's side (or both sides). Sling holsters, while similar to shoulder holsters, but they include only one band worn over the shoulder, while another band anchors around the waist or chest of the user. Holsters also include configurations such as belly holsters, pocket holsters, thigh holsters, and small of back holsters, among several others.

For the present disclosure, the term "food preparation" refers to preparing food for eating, generally requires selection, measurement and combination of ingredients in an ordered procedure so as to achieve desired results. Food preparation includes but is not limited to cooking, and it encompasses a range of methods, utensils and combinations of ingredients to improve the quality, flavor, or digestibility of food. It generally requires the selection, measurement and combining of ingredients in an ordered procedure in an effort to achieve the desired result.

For the purposes of the present disclosure "ingredients" or "food items" or "food product" includes, but is not limited to: sauces, meat items in either stick, chopped, diced, ground, and the like, cheese of all types including block cheese, grated cheese, powdered cheese or liquid cheese. Other ingredients may include doughs, vegetables, pickles, peppers, tomatoes, herbs, spices, and the like, in all of the aforementioned forms, sizes, shapes, and types.

Turning to the present disclosure, a preferred embodiment comprises a holster comprising a removable insert which houses the utensil. The removable insert may be formed from various materials, including acrylic, non-toxic plastics, ceramic, glass, Pyrex, and high quality steel, wood, or food-safe finished materials.

In another embodiment, a fastener capable of repeated opening and closing the holster enclosure may be used. The holster, which comprises a folded portion of leather or fabric is fastened together to form the pocket for receiving the removable insert and ultimately, the utensil. In an exemplary embodiment, the holster is fastened into place with the use of removable fasteners, such as a buckle or a clasp. Buckles are typically known fastening means used for joining the ends of a belt or strap. Buckles join the ends of straps or belts by utilizing a flat, typically rectangular frame with a hinged pin, used for joining two ends—on having the frame comprising the hinged pin, and the other with predetermined holes for receiving the pin. Other fastening embodiments include the use of one or more clasps. Clasps are devices that have interlocking parts used for fastening things together—in the present invention the fastening would represent the two opposing sides of a holster fabric forming the enclosed holster.

In another embodiment, the present invention utilizes Chicago screws, (also known as a barrel nut, barrel bolt, sex bolt, or post and screw), a fastener in accordance with the present disclosure which has a barrel-shaped flange and protruding boss that is internally threaded. The boss sits within the components being fastened; the flange provides the bearing surface. The Chicago screw and accompanying machine screw sit flush on either side of the surfaces being fastened. It is normally chosen because of its low profile compared to other nuts. The Chicago screw often has a built-in feature, such as a slot, to aid in tightening the fastener. Some Chicago screws, more commonly known as 'architectural bolts', have knurled barrels to allow one-sided assembly. 'Binding posts' are similar to architectural bolts in that they are designed to be assembled from one side, but they have teeth on the flanged surface to keep them fixed.

In another embodiment, a fastener is a zipper is utilized to run around the folded edge of the holster fabric. In another embodiment, snaps, buttons, or screws of various types may be used as fasteners for buttoning the folded edges of the holster fabric for forming the enclosed holster. In yet another embodiment, the fastener used for the holster is one or more sections of Velcro, allowing for rapid and repeatable opening and closing of the holster apparatus for purposes of removing the removable insert.

After use, the removable insert may be removed from the holster by un-fastening the holster fasteners, opening the folded holster, and removing the removable insert. In another embodiment, the insert may be anchored to the holster by only a limited number of fasteners opposite the holster opening, thus requiring only the lower fasteners to be un-fastened for purposes of removing the removable insert.

Following removal, the removable insert may be cleaned in a manner customary for maintaining and complying with applicable health standards, including wiping with sanitizers, dipping in sanitizers, washing in dishwashers, irradiating, or other sanitation or sterilization techniques. Once cleaned, the removable inserts may be re-inserted into the holster configuration and fastened within the holster for additional use.

In another embodiment, the holster is capable of magnetic attachment of the utensil. A magnetic insert, serving as the removable insert is placed on the interior of a holster apparatus. The magnetic force is capable of suspending the utensil on the outer portion of the holster apparatus, for rapid placement and recovery by a user. In yet another embodiment, the holster utilizes magnetic fasteners for attachment of the opposing holster apparatus to accommodate the removable insert for then receiving the utensil. In situations involving food preparation utensils subject to significant food exposure and retention on the utensil itself, magnetic suspension prevents the need for a removable insert that is cleaned. Rather, the external surface of the holster, or magnetic surface, is simply cleaned.

Certain embodiments will now be described in greater detail with reference to the figures. Referencing FIG. 1, the utensil holster of the present disclosure comprises a dual holster configuration, wherein two holsters 11, 14, are supported by straps 10 over the shoulder of the user. The straps 10 are connected to the holster via a connector 13, which may comprise an adjustable feature, detachable connector, and the like. The holsters 11, 14 may have a specialized shape for holding specific utensils. In an exemplary embodiment a holster 11 is capable of supporting a pizza cutter 12, while the alternate holster 14 may support a scraper utensil, such as a dough-knife. The utensil holster represented in FIG. 1 may be further anchored, with the use of straps or bands, to a user's belt, or waist in order to hold the holsters 11, 14 against the body of the user.

Figure 2:
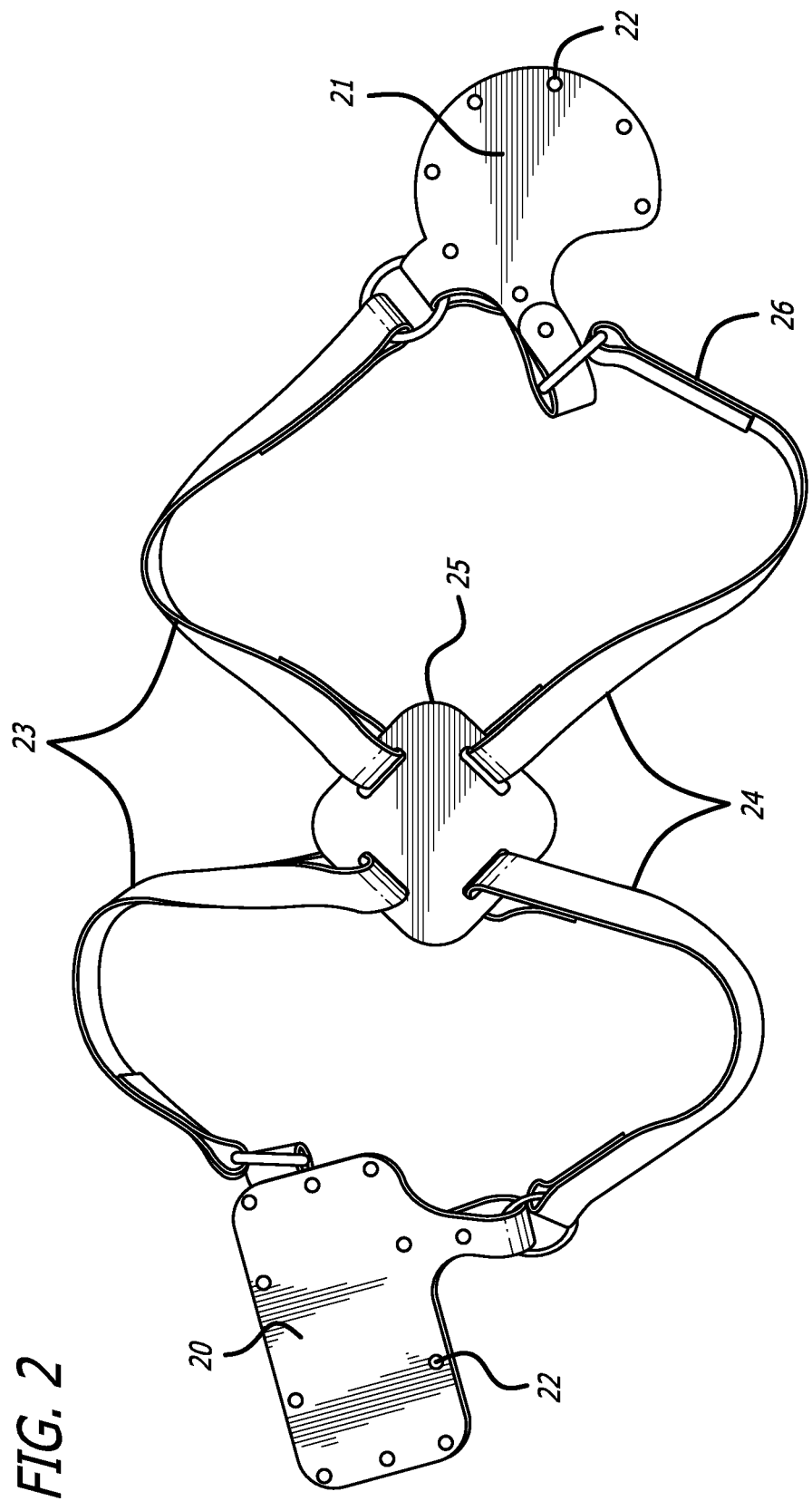
FIG. 2 depicts a dual shoulder holster having two holsters for holding different utensils.

FIG. 2 provides an isolated view of a dual shoulder holster of the present disclosure having holsters 20, 21 configured to hold various utensils. The front straps 24 and rear straps 23 are attached to a rear-central portion 25. The straps are further adjustable via adjustment means 26 for purposes of fitting users of varying sizes. One or more holes 22 are prefabricated in the holsters 20, 21 for fastening the opposing sides of the holster material. Once fastened via the fasteners through the holes 22 in the holsters 20, 21, the holsters 20, 21 are capable of receiving and holding a utensil for a user to remove and insert repeatedly during use. In an alternative preferred embodiment the fasteners comprise the use of buckles or clasps which operate using protruded straps rather than holes 22 for housing fasteners. The buckles or clasps would be fabricated in a standard male/female configuration on opposing holster 20, 21 surfaces. In an alternative embodiment, snap buttons are utilized in exchange for the holes 22.

Figure 3:
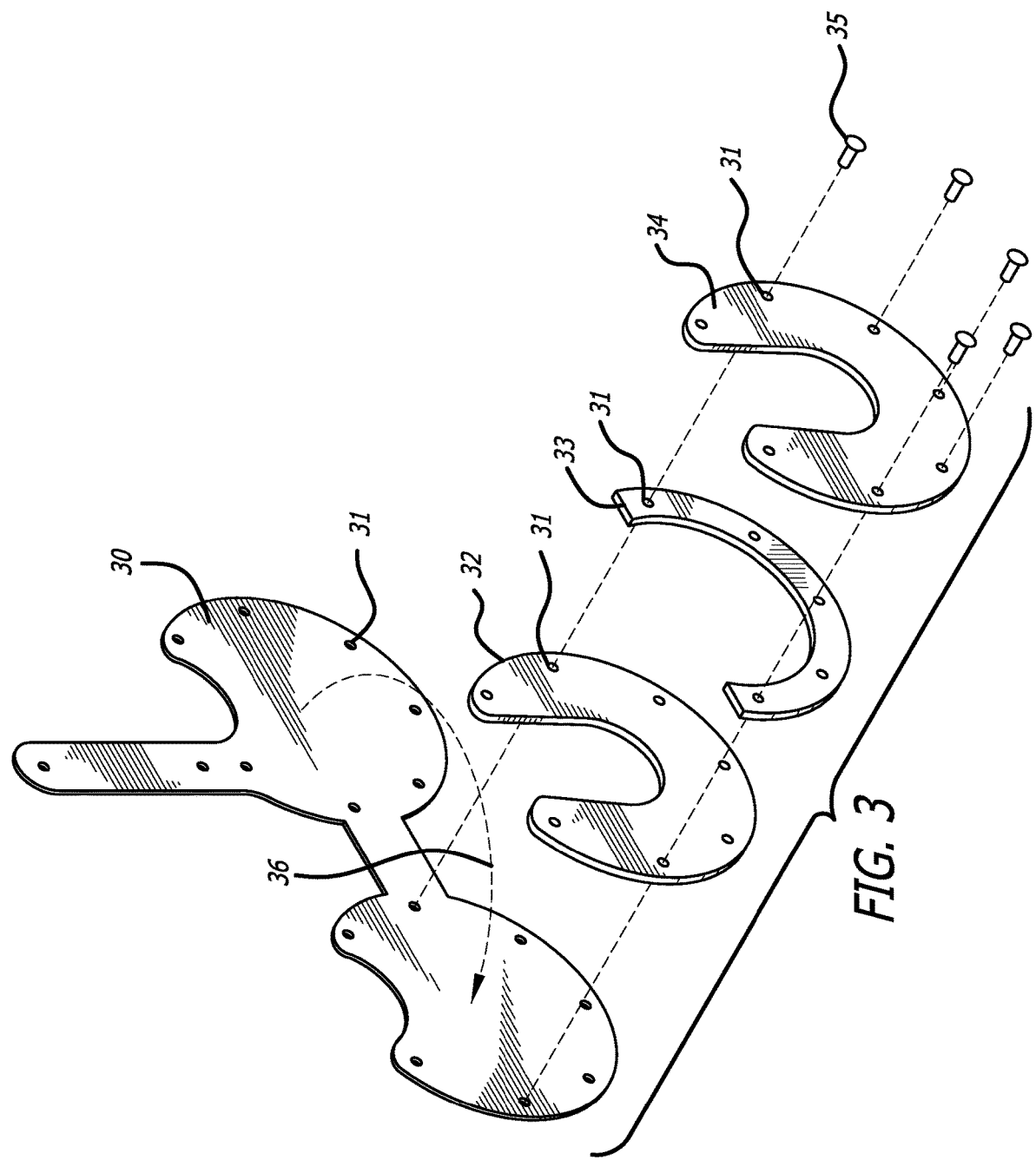
FIG. 3 depicts an exploded perspective view of a holster having a three-piece insert for housing a circular utensil such as a pizza cutter.

Referencing FIG. 3 an exploded view of an exemplary holster of the present disclosure is provided. The holster presented in FIG. 3 is configured to hold a circular utensil, such as a pizza cutter, wherein the two outer portions of the holster 30 may be comprised of a folding 36 material, which encompasses an insert 32, 33, 34 comprised of a material, such as a plastic or acrylic, capable of housing a utensil while maintaining food safety standards. The insert 32, 33, 34 is sandwiched in between the folded outer portion 30 of the holster. Once folded, fasteners 35 are placed within pre-drilled holes and fasten the outer portion 30, with the insert 32, 33, 34 in position for receiving a utensil. The insert 32, 33, 34 may be multi-layered, wherein an enclosure 32, 34 encloses a middle layer 33 capable of supporting the lowered utensil within the holster enclosure. The insert 32, 33, 34 may then be removed after use in order to wash the insert 32, 33, 34 as is required for maintaining food safety standards. In an alternative embodiment, the insert 32, 33, 34 may be comprised of a single material, provided that food safety requirements are maintained by ensuring any recessed portion similar to the middle layer 33 is capable of being adequately cleaned.

Figure 4:
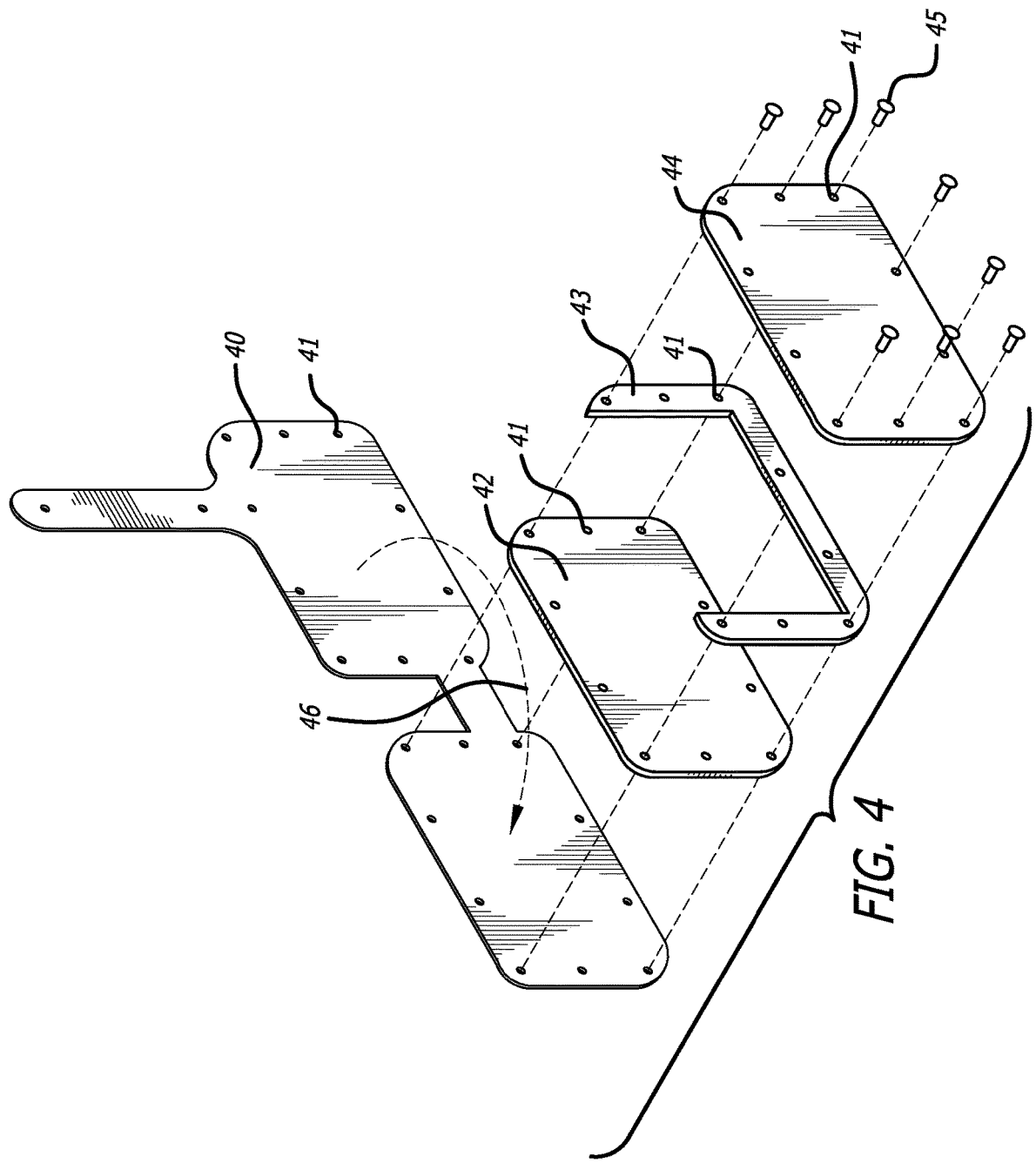
FIG. 4 depicts an exploded perspective view of a holster having a three-piece insert for housing a squared utensil such as a dough knife or scraper.

Referencing FIG. 4 a second exploded perspective view of an exemplary holster of the present disclosure is provided. The holster presented in FIG. 4 is configured to hold a squared utensil, such as an oven or kitchen scraper, wherein two outer portions of the holster 40 may be comprised of a folding 46 material capable of encompassing an insert 42, 43, 44 comprised of a material, such as a plastic or acrylic, capable of housing a utensil while maintaining food safety standards. The insert 42, 43, 44 is sandwiched in between the folded outer portion 40 of the holster. Once folded, fasteners 45 are placed within pre-drilled holes and fasten the outer portion 40, with the insert 42, 43, 44 in position for receiving a utensil. In an alternative preferred embodiment the fasteners comprise the use of buckles or clasps which operate using protruded straps rather than holes 41 for housing fasteners. The buckles or clasps would be fabricated in a standard male/female configuration on opposing holster 40 surfaces. In an alternative embodiment, snap buttons on the opposing holster 40 surfaces are utilized in exchange for the holes 41. The insert 42, 43, 44 may be multi-layered, wherein an enclosure 42, 44 encloses a middle layer 43 capable of supporting the lowered utensil within the holster enclosure. The insert 42, 43, 44 may then be removed after use in order to wash the insert 42, 43, 44 as is required for maintaining food safety standards. In an alternative embodiment, the insert 42, 43, 44 may be comprised of a single material, provided that food safety requirements are maintained by ensuring any recessed portion similar to the middle layer 43 is capable of being adequately cleaned.

Of critical importance to the embodiments of the present disclosure is maintaining the ability to remove the holster inserts from the outer holster material in order to adequately clean the inserts. Maintaining properly sanitized utensils is a requirement of food establishments and foodservice employees that use them. Once a food worker uses a utensil such as a spoon, spatula, or knife, it is considered an in-use utensil. In-use utensils must be stored safely and cleaned on a schedule that stops the growth of bacteria that may be on the surface. Often soiled utensils are not properly cleaned or sanitized, and they may end up in sanitizer buckets with soiled solutions and food particles. For example, some food safety requirements suggest utensils must be washed rinsed and sanitized every 4 hours to prevent cross contamination. Another suggested practice involves keeping utensils purpose-specific. Rather than having a common sanitizer bucket with multiple types of utensils, the holsters of the present disclosure allow for purpose specific utensils to be returned to their same holster, without the risk of cross-contamination. This clean, protected location is allowable so long as the utensils are continually used with a food that is not potentially hazardous, and that the utensil remains scheduled to stop any potential growth of bacteria. In another embodiment of the present disclosure, a holster insert comprises an acrylic or plastic material which comprises biocidal surface characteristics.

Those skilled in the art will recognize that the methods and articles of the present disclosure may be implemented in many manners and as such are not to be limited by the foregoing exemplary embodiments and examples. In this regard, any number of the features of the different embodiments described herein may be combined into single or multiple embodiments, and alternate embodiments having fewer than, or more than, all of the features described herein are possible, including multiple holsters, quivers, and other receptacles for holding utensils.

Moreover, the scope of the present disclosure covers conventionally known manners for carrying out the described features, as well as those variations and modifications that may be made to the components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements described above to obtain a result that remains within the scope of the holster described in this disclosure.

What is claimed is:

1. A utensil holster, comprising one or more shoulder holsters for receiving one or more utensils, wherein the one or more shoulder holsters each further comprises a removable insert having an opening capable of receiving a utensil into the removable insert while installed in the shoulder holster and wherein the one or more shoulder holsters are configured for receiving a utensil selected from a group consisting of: a fork, spoon, pizza cutter, scraper, rolling pin, cutlery, dough cutter, dough knife, spatula, grater, and a brush.

2. The utensil holster of claim 1, wherein the one or more shoulder holsters are capable of receiving and storing a utensil while maintaining food safety requirements.

3. The utensil holster of claim 1, wherein the one or more removable inserts are comprised of plastic.

4. The utensil holster of claim 1, wherein the one or more removable inserts are comprised of acrylic.

5. The utensil holster of claim 1, wherein the exterior portion of the one or more shoulder holsters is made of leather.

6. The utensil holster of claim 1, wherein the exterior portion of the one or more shoulder holsters is made of fabric.

7. The utensil holster of claim 1, wherein the one or more shoulder holsters are securable to a user by additional straps or bands.

8. The utensil holster of claim 1, wherein the one or more removable inserts are capable of being removed and cleaned prior to re-insertion into the one or more shoulder holsters.

9. The utensil holster of claim 1, wherein the one or more shoulder holsters comprise removable fasteners to allow the one or more shoulder holsters to operably unfold in order to remove the removable insert from the shoulder holster.

10. A system for in-use utensil storage, comprising one or more shoulder holsters for receiving and housing a utensil selected from a group consisting of: a fork, spoon, pizza cutter, scraper, rolling pin, cutlery, dough cutter, dough knife, spatula, grater, and a brush, and further comprising an exterior portion and interior removable insert fastened by one or more removable fasteners, wherein the interior removable insert may be removed from the external portion of the one or more shoulder holster assemblies for purposes of cleaning the removable insert in accordance with food safety requirements.

11. The system of claim 10, wherein the one or more removable inserts are comprised of plastic.

12. The system of claim 10, wherein the one or more removable inserts are comprised of acrylic.

13. The system of claim 10, wherein the exterior portion of the one or more holsters is made of leather.

14. The system of claim 10, wherein the exterior portion of the one or more shoulder holsters is made of fabric.

15. The system of claim 10, wherein the one or more shoulder holsters are securable to a user by additional straps or bands.

16. The system of claim 10, wherein the one or more removable inserts are capable of being removed and cleaned prior to re-insertion into the one or more shoulder holsters.

17. The system of claim 10, wherein the one or more shoulder holsters comprise removable fasteners to allow the one or more shoulder holsters to operably unfold in order to remove the removable insert from the shoulder holster.

* * * * *